(12) United States Patent
Vice

(10) Patent No.: US 7,567,282 B2
(45) Date of Patent: Jul. 28, 2009

(54) OPERATOR CONTROL UNIT WITH TRACKING

(75) Inventor: Jack M. Vice, Glenndale, MD (US)

(73) Assignee: Anthrotronix, Inc., Silver Spring, MD (US)

( * ) Notice: Subject to any disclaimer, the term of this patent is extended or adjusted under 35 U.S.C. 154(b) by 331 days.

(21) Appl. No.: 10/739,603

(22) Filed: Dec. 18, 2003

(65) Prior Publication Data
US 2005/0134716 A1    Jun. 23, 2005

(51) Int. Cl.
*H04N 5/222* (2006.01)
(52) U.S. Cl. .................................. 348/333.02
(58) Field of Classification Search ............ 348/333.01, 348/333.02; 345/7, 8
See application file for complete search history.

(56) References Cited

U.S. PATENT DOCUMENTS

| | | | | |
|---|---|---|---|---|
| 5,262,838 A | * | 11/1993 | Tocher ........................ | 356/16 |
| 5,365,218 A | * | 11/1994 | Otto ........................... | 340/557 |
| 5,491,510 A | * | 2/1996 | Gove .......................... | 348/77 |
| 5,623,335 A | * | 4/1997 | Bamberger ................ | 356/5.01 |
| 5,838,330 A | * | 11/1998 | Ajima ........................ | 345/427 |
| 5,841,409 A | * | 11/1998 | Ishibashi et al. ............ | 345/8 |
| 6,083,353 A | * | 7/2000 | Alexander, Jr. ............. | 202/158 |
| 6,181,302 B1 | * | 1/2001 | Lynde ......................... | 345/7 |
| 2003/0043268 A1 | | 3/2003 | Mann | |
| 2004/0167682 A1 | * | 8/2004 | Beck et al. ................... | 701/3 |

FOREIGN PATENT DOCUMENTS

EP        0790734        8/1997

\* cited by examiner

*Primary Examiner*—David L Ometz
*Assistant Examiner*—Dillon Durnford-Geszvain
(74) *Attorney, Agent, or Firm*—Lieberman & Brandsdorfer, LLC

(57) ABSTRACT

An apparatus equipped with an electronic camera, lensed optics, and a visual display in communication with the optics. An analog or digital video signal is conveyed to an operator of the apparatus through the visual display. The apparatus includes an embedded processor to track the orientation and position of the apparatus. Orientation and position information of the apparatus is used to dynamically recalculate display information. In addition, the apparatus may be in communication with a remote device having digital camera optics. Orientation and position information of the apparatus may be conveyed to the remote device to alter the orientation and position of the associated electronic camera optics. Accordingly, data conveyed to the operator of the apparatus is in relation to the orientation and position of the apparatus and/or the associated orientation and position of the remote device.

35 Claims, 7 Drawing Sheets

OPERATOR CONTROL UNIT WITH TRACKING

BACKGROUND OF THE INVENTION

1. Technical Field

This invention relates to an apparatus for remote communication. More specifically, the apparatus is adapted to convey information pertaining to the operator with respect to the locale of the apparatus and/or a remote device in communication with the apparatus.

2. Description of the Prior Art

Portable computing apparatus, such as laptop computers and personal digital apparatus, are commonly used for remote computing needs and communication with computer systems and networks. A person utilizing such apparatus can enter data into the apparatus as long as the apparatus has an input device and source of power.

Many known portable computing apparatus also contain communication electronics, such as a modem, which enable the operator to send and receive data to and from the apparatus and other computer systems or networks. Most modems require the operator to physically connect their apparatus to a telecommunication link. However, recently developments for communication apparatus capable of transmitting and receiving data from a remote device through a wireless connection include radio frequency transceivers. Accordingly, portable computing apparatus, which enable operators to remotely communicate with other devices and transmit data to and receive data from other devices, is common in the art.

There are several apparatus that enable remote communication. For example, laptop computers enable people to do computing from a relatively compact personal computer and transmit data through a connection to a network or other computer system. Similarly, personal digital apparatus with communications hardware enable users to do remote computing on a more limited basis and to transmit files to remote device through a communications connection to a computer network. However, neither the laptop nor the personal digital apparatus is designed to account for the physical environment of the unit in which the embedded processor is housed, and to communication the physical environment to the operator. In addition, laptops, personal digital apparatus, and similar computing apparatus are not generally designed to enable wireless communication with another remote device other than computer apparatus or enable bi-directional communication with such apparatus. Accordingly, what is desired is an embedded processor, which can be worn on a body part of the user, that enables remote wireless communication with a remote device while accounting for the physical environment and positioning of the processor.

SUMMARY OF THE INVENTION

This invention comprises a control unit for remote communication.

In a first aspect of the invention, an operator control apparatus is provided with digital camera optics in communication with a visual display. The optics are adapted to provide a digital video signal. In addition, an embedded processor adapted to track change to orientation and position of the apparatus is provided. The embedded processor recalculates data to be displayed based on the change.

In a second aspect of the invention, a method is provided for remote communication. A digital video signal is provided to a visual display through digital camera optics. Change in orientation and position of an apparatus in communication with the visual display is tracked, and data to be displayed is recalculated based on the change of the apparatus.

In a third aspect of the invention, an article in a computer-readable signal-bearing medium is provided. Means in the medium are provided for a digital video signal in communication with a visual display. In addition, means in the medium are provided for tracking orientation and position of an apparatus in communication with the visual display and for projecting orientation and position data of the apparatus to the visual display.

Other features and advantages of this invention will become apparent from the following detailed description of the presently preferred embodiment of the invention, taken-in conjunction with the accompanying drawings.

DESCRIPTION OF THE PREFERRED EMBODIMENT

Overview

An apparatus for conveying local and/or remote information to an operator is provided. The positioning of the apparatus may control the information conveyed to the operator. An embedded processor of the control unit computes the position and orientation of the apparatus and gathers data associated therewith. In addition, the apparatus may communicate with a remote device. The orientation of the apparatus may be used to control the orientation of the remote device, and associated data gathered from the remote device and transmitted to the apparatus. Accordingly, the position and orientation of the apparatus control the data gathered and conveyed to the operator.

Technical Details

Figure 1:
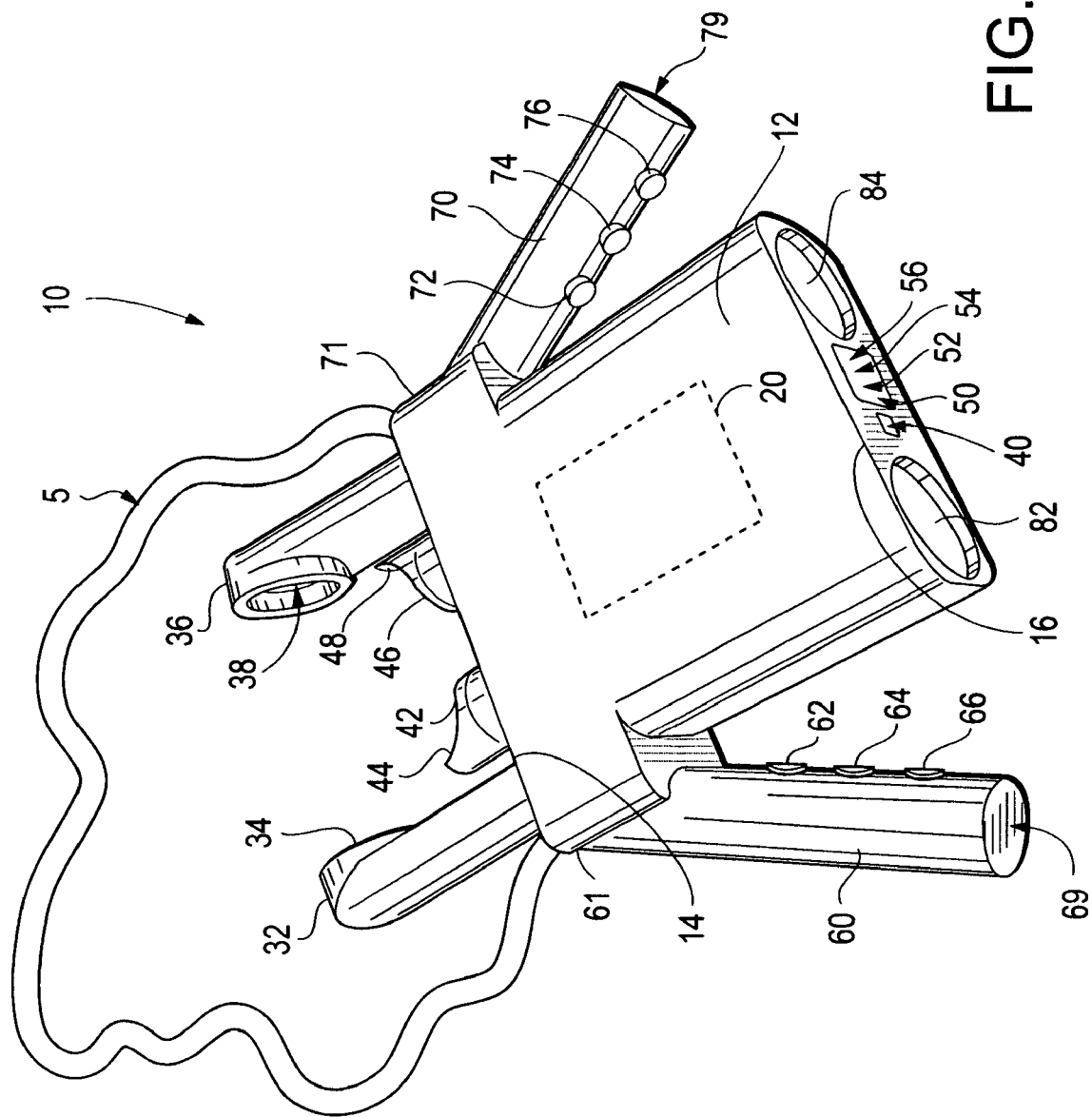
FIG. 1 is a perspective view of the operator control unit according to the preferred embodiment of this invention, and is suggested for printing on the first page of the issued patent.
Figure 7:
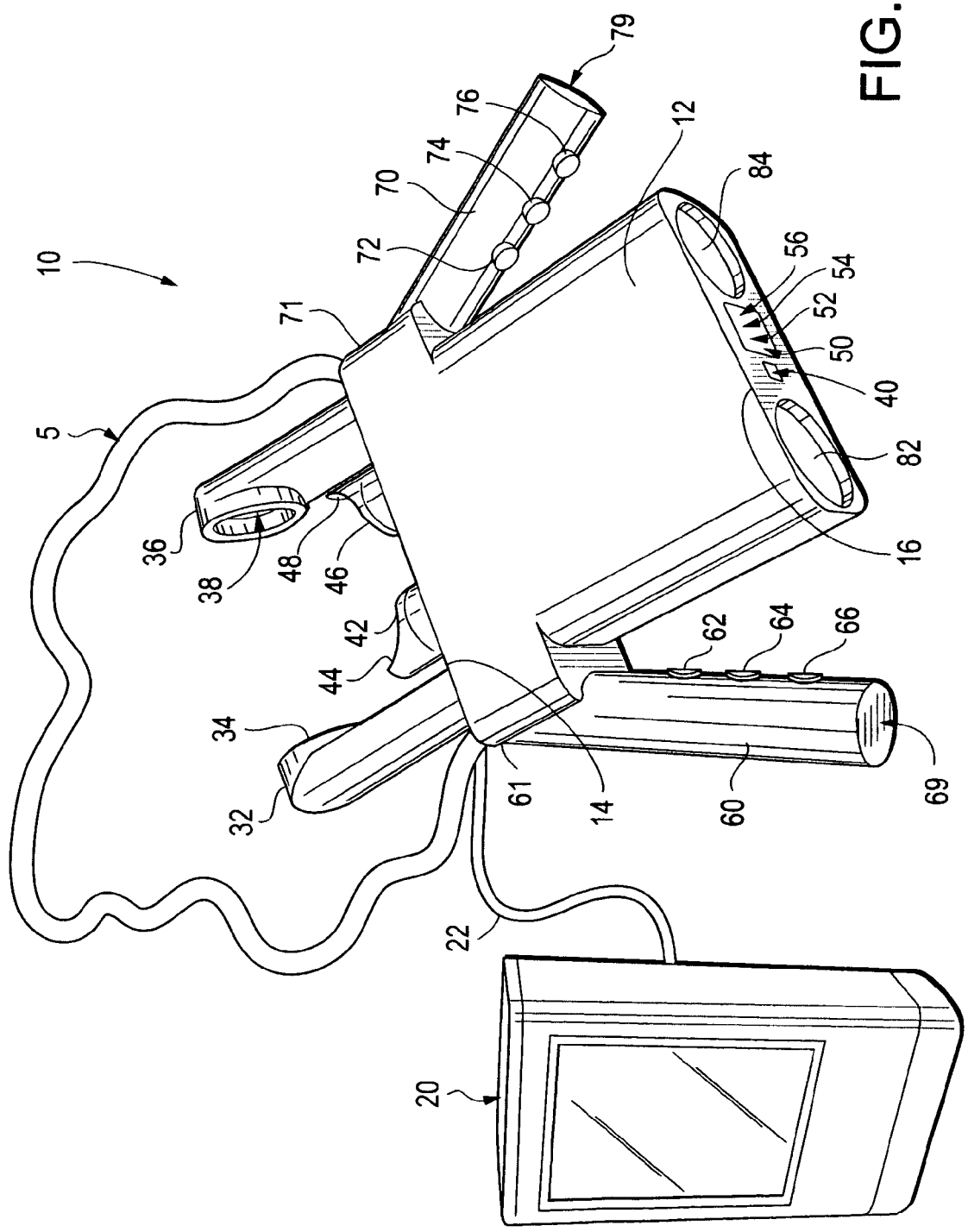
FIG. 7 is a perspective view of the operator control unit with a tethered computation device.

As shown in FIG. 1, the control unit 10 is in the physical form representative of a binocular. The control unit 10 may be hand held, or worn around a body part of the operator with a strap 5. The control unit 10 has a case 12 adapted to house internal components, such as sensors and I/O apparatus. Data processing is performed by a computation device 20 that is shown embedded to the control unit 10. However, in an alternative embodiment, as shown in FIG. 7, the computation unit 20 may be tethered to the control unit 10 by a signal and power cable 22. The computation unit 20 includes a computer with an embedded processor. Preferably, the embedded processor includes a wireless communication apparatus to enable communication between the embedded processor and a remote device. The case 12 has a proximal end 14 and a distal end 16.

A set of ear pieces 32, 36 are mounted adjacent to the proximal end 14 for receipt of auditory data. External sound sources are damped by pliable material 34, 38 on the earpieces 32, 36, respectively, resulting in enhanced clarity of presentation of the auditory data to the operator. The control unit 10 has a directional microphone 40 to detect auditory data conveyed to the earpiece. Similarly, a set of eyepieces 42, 46 are mounted adjacent to the proximal end 14 for receipt and presentation of visual data to the operator. External light sources are shielded from the display using pliable material 44, 48 that conforms to the operator's face. Within the pliable material 44, 48 of eyepieces 42, 46 are pressure sensors (not shown) indicating proximity of the operators face with respect to the control unit. Both the ear and eye pieces are adapted to receive data in stereo format. In addition, the control unit 10 includes a light sensor 50, a light amplification sensor array 52, digital video camera optics (not shown), an infra-red amplification sensor array 54 to convey visual data to the operator through the eyepieces 42, 46, and lens optics 82 and 84 to provide a magnified analog display to the operator. Accordingly, the control unit 10 includes apparatus for conveying auditory and visual information to an operator of the unit.

In addition to conveying information to the operator of the unit, input apparatus are provided to collect data as well as enable communication between the operator and the unit, and/or between the operator and a remote device. A set of input devices 60 and 70 are provided on each lateral side of the control unit 10. The input devices preferably include additional input devices 62, 64, and 66, and 72, 74, and 76, shown in the form of tactile pushbuttons. Each of the input devices is mapped to a set of corresponding logical states in the control unit and/or a remote device. A logical state may correspond to activation of one or more actuators on the remote device. One or more of the input devices may be in the form of a proportional input device, such as a proportional input grip, as shown in FIG. 1. Each proportional input grip is preferably enclosed within neoprone boots (not shown) to protect the components of the proportional input grip from dust and moisture. Other materials may be used to insulate the proportional input grips from dust, moisture, electromagnetic interferences, and any other condition that would affect communication and operation of the proportional input grip. In addition, the boots function as a seal between the input device and the control unit case 12.

Each proportional input grip 60, 70 has a proximal end 61, 71 and a distal end 69, 79, respectively. The distal ends of the proportional input grips extend from a surface of the case 12 and may be actuated by the operator. Similarly, the proximal ends 61, 71 of the proportional input grips 60, 70 are connected to electronic circuits that reside within an interior section of the case 12. As the proportional input grip is revolved around its center axis, a signal is produced that corresponds to the degree of actuation. The signal is preferably in the form of a voltage output that preferably ranges from 0 to 5 volts, but may be calibrated for a lesser or greater output. As the proportional input grip 60, 70 is rotated about its axis, a proportional voltage is output to the associated electronic circuit. Alternatively, the proportional input grip may use optical motion detection, wherein an optical signal would be digitized at an analog to digital converter bypassing any electronic circuits. Actuation of the proportional input grip 60, 70 may be communicated to a respective logical state or motor of the remote device controlling direction, velocity and/or illumination for any apparatus adapted to receive the variable input. The signal from the circuit board associated with the proportional input device 60, 70 is processed by an analog to digital converter to digitize the data into a computer readable format. Following the digitizing process, the processed data is streamed to a communication port of the embedded processor. The radial proportional input grip motion described for the proportional input devices 60, 70 may be replaced by any other proportional movement that would be necessary to control the remote device. However, actuation of the proportional input grip is not limited to communication with a remote device. The proportional input grip may also be used to communicate with the visual display. Accordingly, the proportional input device functions as an input device in communication with the control unit 10 to provide a proportional signal to the embedded processor of the control unit and/or a remote device.

As with the proportional input devices 60, 70, the tactile buttons 62, 64, 66, 72, 74, 76 convey information from the operator to a circuit board associated therewith, which transmits the data to an analog-digital converter. Wired communication electronics are integrated into the analog-digital converter to digitize the data into a computer readable format and to communicate data received from the input device to the embedded processor or streamed to a communication port of the embedded processor. The tactile buttons may be used to communicate with either the visual display or the remote device, or both. Functionality associated with the tactile pushbuttons may include, switching modes of operation, switching proximity sensors, and navigation within a graphical user interface. Pressure sensors in the proportional input device, known in the art as "dead man" switches, control communication signals between the control unit 10 and the remote device. For example, a release of one of the pressure sensors sends a communication signal to the remote device to enter a safe state. Whereas, when the pressure sensor is engaged, communication between the control unit 10 and the remote device can be achieved. In a preferred embodiment, the tactile pushbuttons are separated by a silicone rubber membrane to prevent moisture and dust from entering the case 12. However, the membrane may be comprised of an alternative material that provides protection of the interior section of the case and associated circuit board(s) from damage due to dust, moisture, and environmental weather conditions. Accordingly, actuation of the tactile pushbuttons enables an operator of the unit to communicate a variety of signals to the embedded processor for local or remote communication.

The hardware components of the control unit 10 may be used to visually convey data from a remote device to an operator of the unit 10. Visual data are displayed to the operator on the visual display as seen through the eyepieces 42 and 46. There are four modes of operation for visual display, including a local situational awareness (LSAM), remote situational awareness (RSAM), first person map (FPMM), and bird's eye map (BEMM). The control unit 10 includes several apparatus to operate in each of these modes. For example, a global positioning system (GPS) sensor (not shown) is provided to convey the location of the control unit 10 to the embedded processor of the control unit. An electronic compass (not shown) and an electronic accelerometer (not shown) are provided to convey direction with respect to North and angle with respect to the Horizon, respectively, to the embedded processor of the control unit 10. Similarly, all position and orientation information gathered by the remote device are conveyed to the embedded processor of the control unit. In addition, a rangefinder 56 is provided both on the control unit 10 and the remote device. The rangefinder conveys distance to a specific object or location by calculating a range to objects of interest. In one embodiment, the rangefinder may be in the form of an electromagnetic signal. Accordingly, the apparatus of the control unit includes tools to collect appropriate data to enable the four modes of operation.

Figure 2:
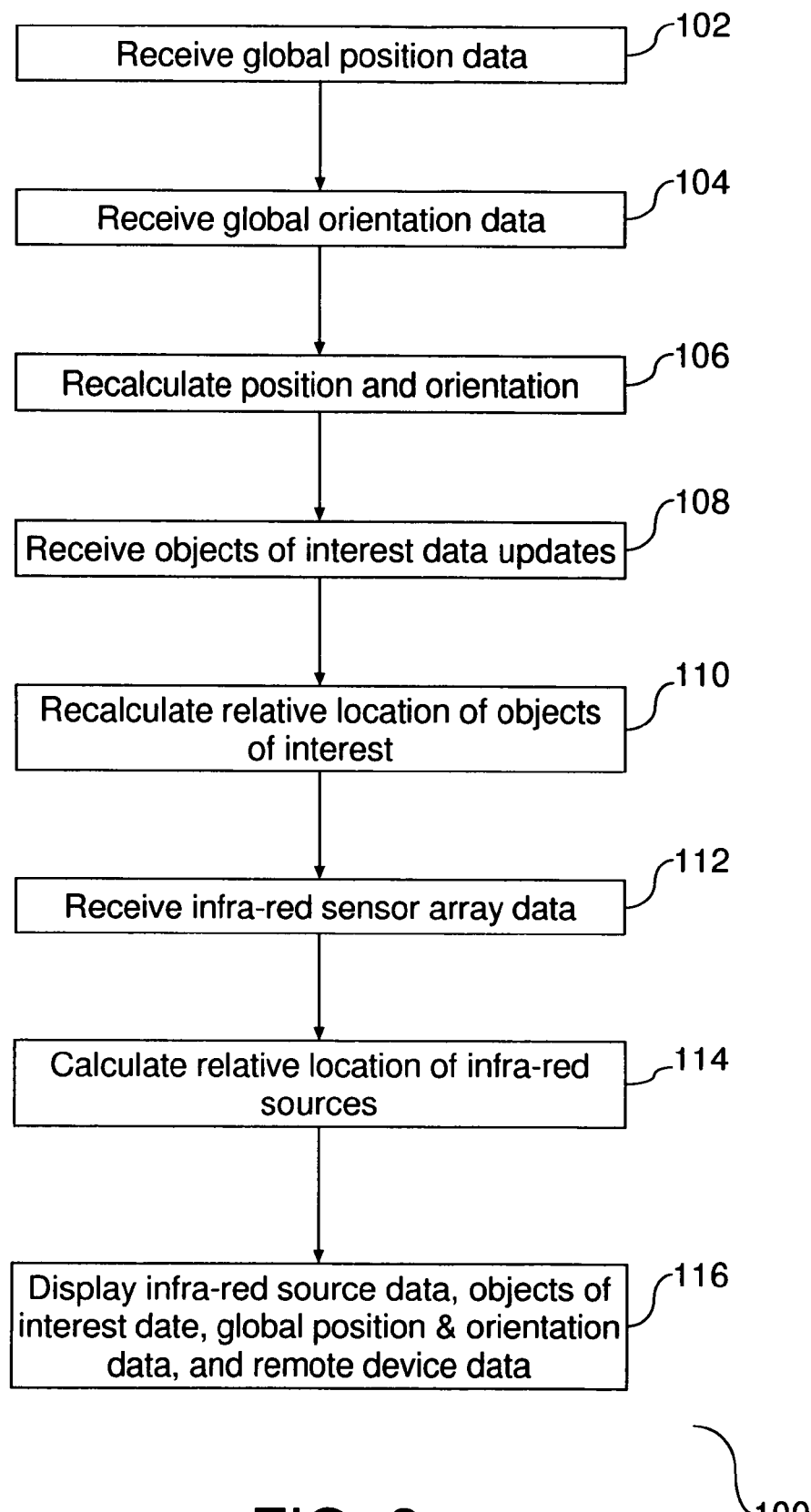
FIG. 2 is a flow diagram illustrating the local situational awareness mode.

FIG. 2 is a flow diagram 100 illustrating process of conveying data to an operator utilizing the local situational awareness mode (LSAM) of the control unit 10. When the control unit 10 is operated in the local situational awareness mode (LSAM), the operator can enhance his/her vision of immediate surroundings through video data from the light amplification sensor array 52, lens optics 82 and 84, or both. The first step in entering the local situational awareness mode is for the embedded processor of the control unit 10 to receive global position data from the GPS sensor of the control unit 102. Thereafter, the embedded processor of the control unit 10 receives global orientation data from the electronic accelerometer and electronic compass of the control unit 104. Upon receiving the data at steps 102 and 104, the processor calculates position and orientation of the control unit 106. Following receipt and calculation of control unit position data, object of interest data is received 108. The location of the object(s) of interest 110 is calculated relative to the control unit 10. Thereafter, infra-red sensor array data is collected and received 112, and the location of the infra-red sources are calculated relative to the location of the control unit 114. Information gathered by the remote device or any other source(s) relative to the object of interest is displayed in a transparent overlay form relative to the actual position of the object(s) of interest with respect to the position and orientation of the control unit 116. Such information may include infra-red source data. Accordingly, the local situational awareness mode (LSAM) receives and calculates data with respect to an object of interest and conveys the data to the control unit with respect to the position and orientation of the control unit.

Figure 3:
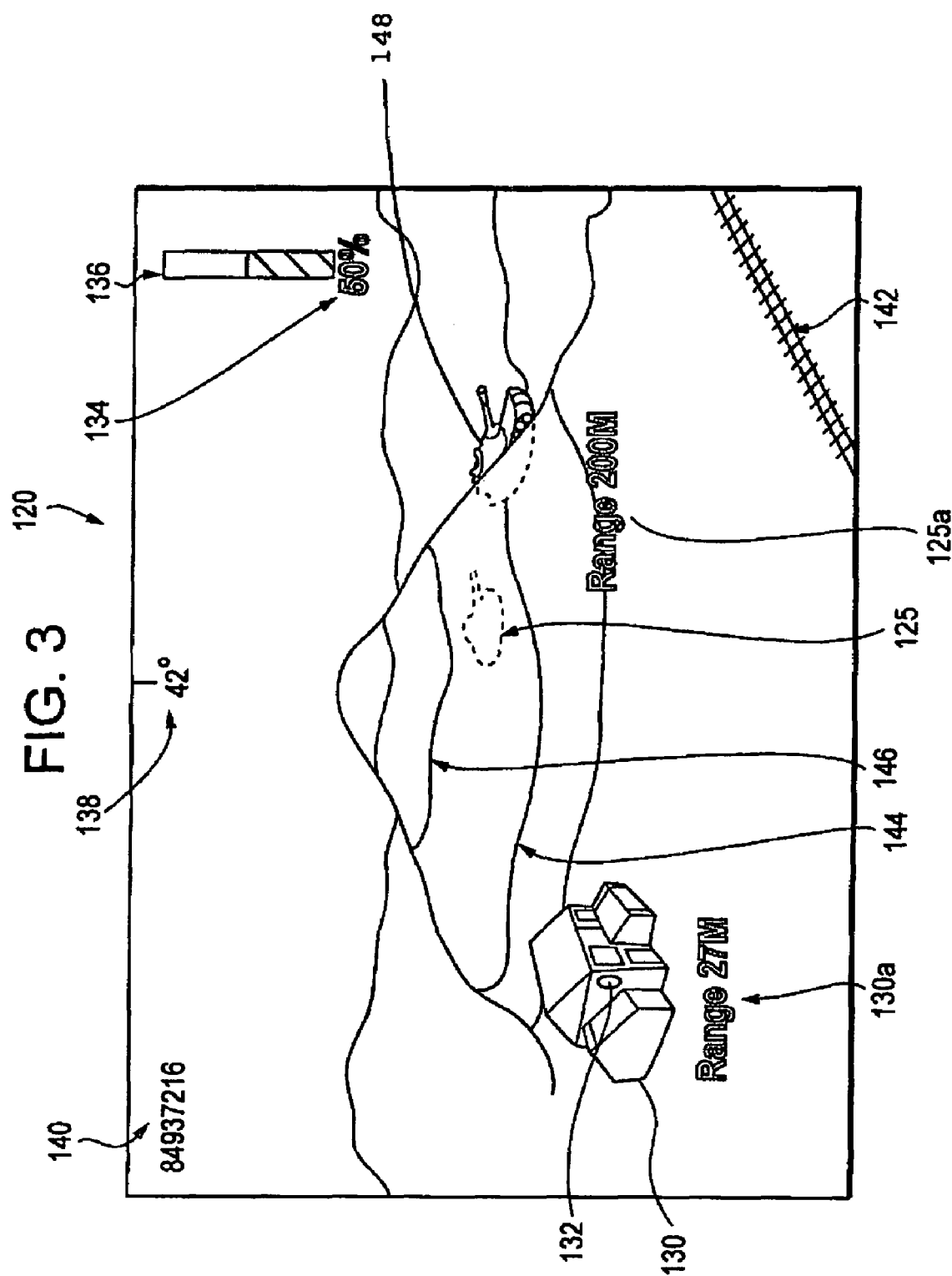
FIG. 3 is an illustration of a graphical user interface with data overlay.

The overlay information gathered in the local situation awareness mode of operation can indicate the location of objects of interest which are not directly visible to the operator. In addition, the overlay information provides information about objects which are visible to the operator. FIG. 3 is a panoramic view 120 of a visual display in the local situational awareness mode (LSAM). The are two noted objects of interest, object 125 which is not directly visible to the operator, and object 130 which is visible to the operator. The distance of the objects of interest 125a and 130a to the control unit are noted adjacent to each object. In this example, the objects of interest are 200 meters and 27 meters, respectively. Infra-red sensor data 132 is displayed relative to the actual location of the infra-red source. The data overlay display may optionally include telemetry data from the remote device 148 as transparent text 134 and/or graphics display 136. Global orientation data 138 and position information 140 may also be provided in the display. In addition, standard map symbols representing conventional objects are represented, as well as grid lines 144 and 146, representing topographical information. For example, a railway line 142 is shown. Accordingly, in the local situational awareness mode (LSAM), an operator of the control unit may enhance his/her vision of his/her surroundings through video data from the light amplification sensor array of the control unit and/or through lens optics of the control unit.

Figure 4:
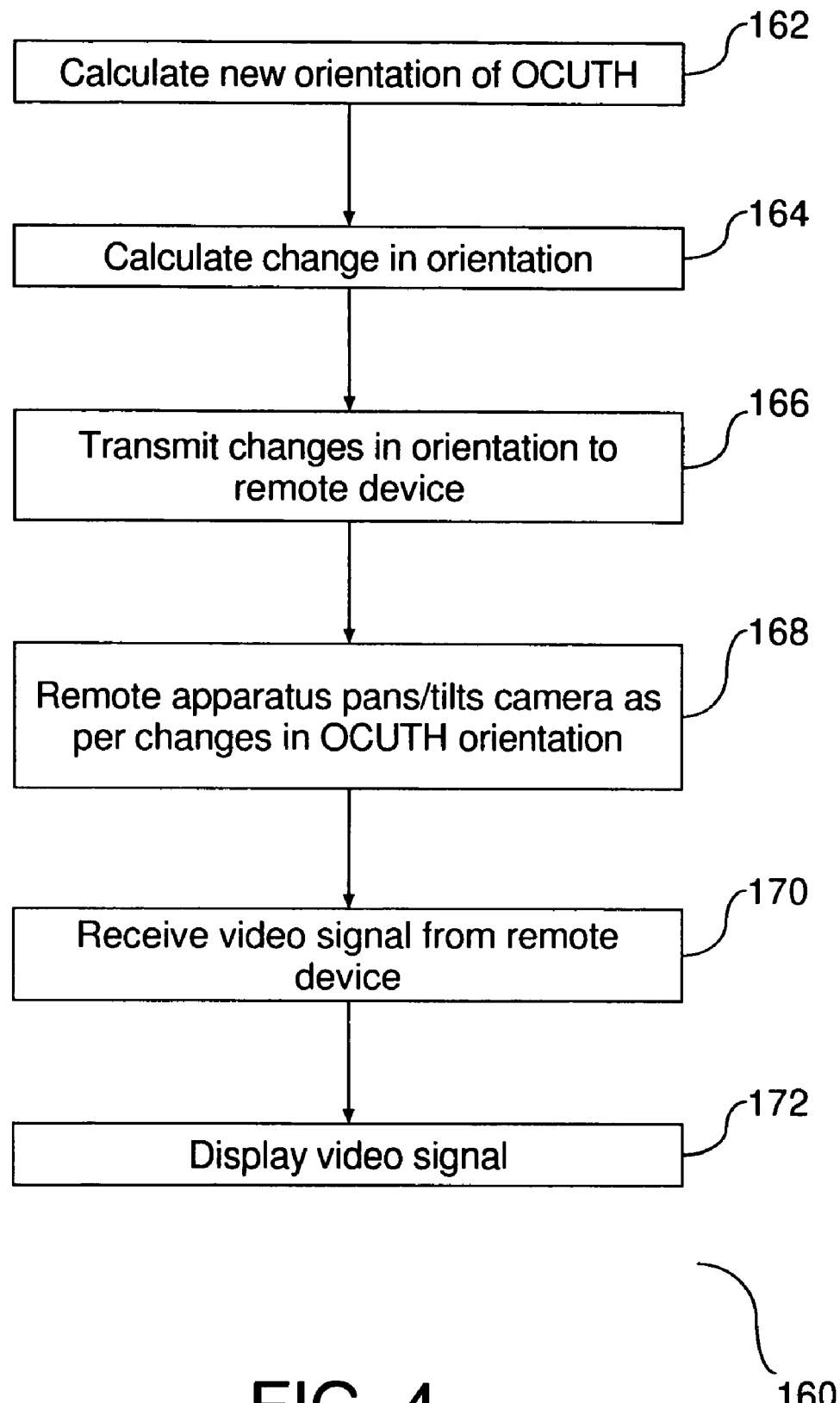
FIG. 4 is a flow diagram illustrating the remote situational awareness mode.

FIG. 4 is a flow diagram 160 illustrating process of conveying data to an operator utilizing the remote situational awareness mode (RSAM) of the control unit. When the control unit 10 is operated in the remote situational awareness mode (RSAM), the operator requests a change in orientation of a camera in communication with the remote device. The camera gathers data and communicates that data to the control unit. In the remote situational awareness mode (RSAM), a change in the orientation of the control unit corresponds to new orientation data for the camera of the remote device. The first step in entering the remote situational awareness mode (RSAM) is to calculate the orientation of the control unit 162. Thereafter, any change in orientation from the prior position data of the control unit is calculated 164. The change in the orientation of the control unit is transmitted to the remote device 166. Following transmission of the orientation change, the remote device modifies the orientation and/or position of it's camera to reflect the changes communicated from the control unit 168. Thereafter, the control unit receives a video signal from the remote device 170, and displays the video signal to the operator 172. The purpose of the remote situational awareness mode (RSAM) is to convey a change in the positioning of the remote device and associated camera. The orientation of the control unit 10 directly controls the orientation of the video sensors on the remote device. The combination of sending orientation changes and receiving video signal(s) is a form of bi-directional communication between the control unit and the remote device. The bi-directional communication between the control unit and the remote device is interactive by its nature. The orientation and position of the video sensor on the remote device are mapped to coincide with the orientation and position of the control unit 10. Accordingly, the new orientation of the camera of the remote device enables the remote device to transmit data from a new orientation and to focus on changes in objects of interest or on new objects of interest.

Figure 5:
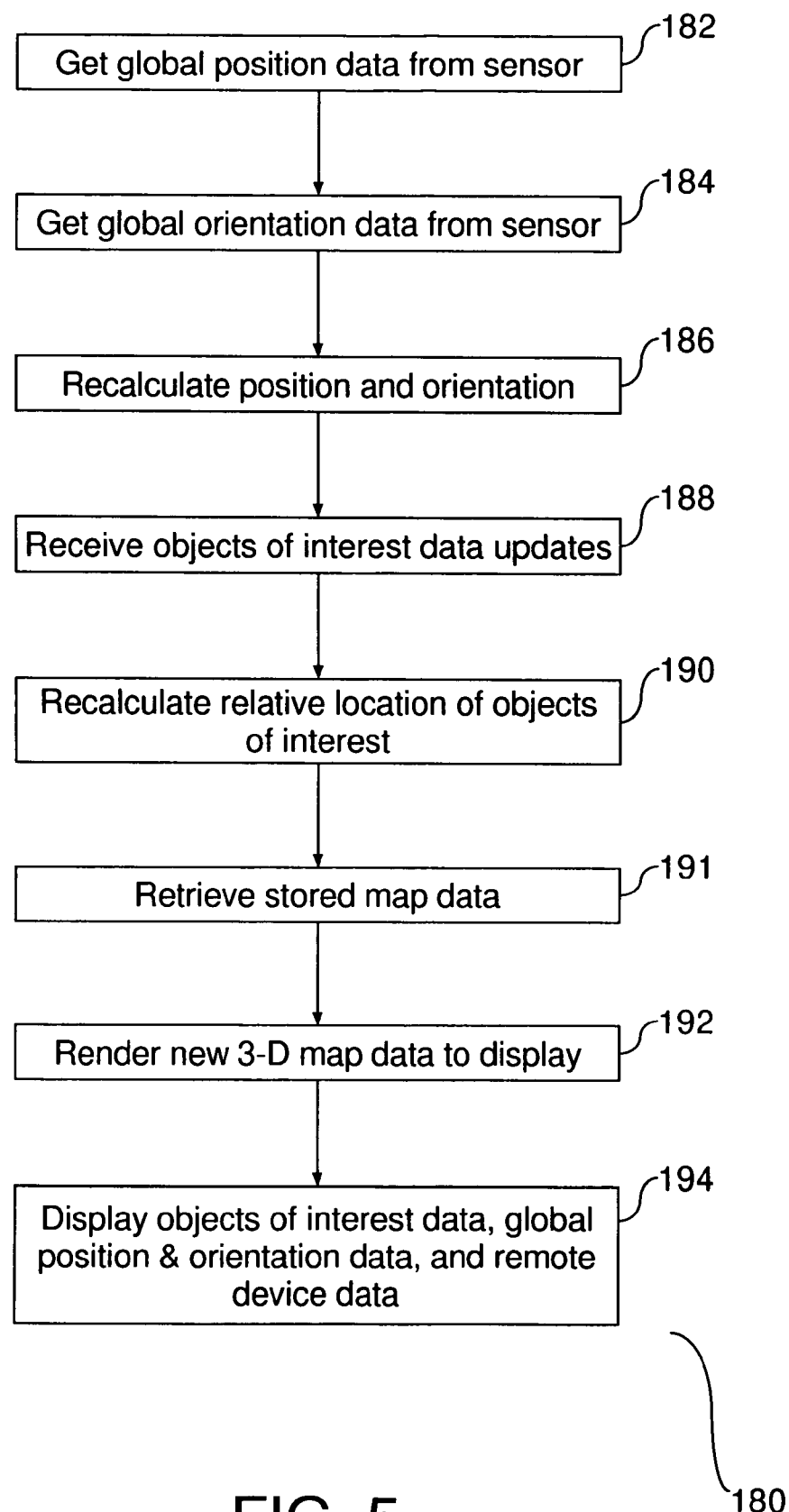
FIG. 5 is a flow diagram illustrating the birds eye map mode.

FIG. 5 is a flow diagram 180 illustrating the process of conveying map data to an operator utilizing the birds eye map mode (BEMM). The purpose of this mode is to provide three dimensional map data to the control unit visible to the operator through the visual display. Following initiation of the birds eye map mode, the embedded processor of the control unit 10 receives global position data from the GPS sensor of the control unit 182. Thereafter, the embedded processor of the control unit 10 receives global orientation data from the electronic accelerometer and electronic compass of the control unit 184. Upon receiving the data at steps 182 and 184, the processor calculates position and orientation of the control unit 186. Following receipt and calculation of control unit position data, object of interest data is received 188. The location of the object(s) of interest is calculated relative to the control unit 190. Map data is retrieved from a data storage medium in communication with the embedded processor of the control unit 191. Thereafter, a new three dimensional map is created and sent to the visual display of the control unit for use by the operator 192. Information gathered by the remote device or any other source(s) relative to the object of interest is displayed in an overlay form relative to the actual position of the objects of interest with respect to the position and orientation of the control unit 194. In the BEMM, the control unit 10 displays three dimensional map data to the operator as if the operator were a set distance above his/her current position, or that of the position of the remote device, i.e. looking down. The map information is displayed with proper orientation to north together with the current location of the control unit 10 and the remote device. In this mode, as the operator orients and changes the control unit 10, the map data changes accordingly. Preferably, terrain detail is displayed as a wireframe, and natural and artificial objects are displayed using standardized coded map symbols. Map data is stored in persistent memory and may be updated by satellite data and remote pilot vehicles. Accordingly, the birds eye map mode (BEMM) is intended to retrieve and convey map data based upon orientation of the control unit.

Figure 6:
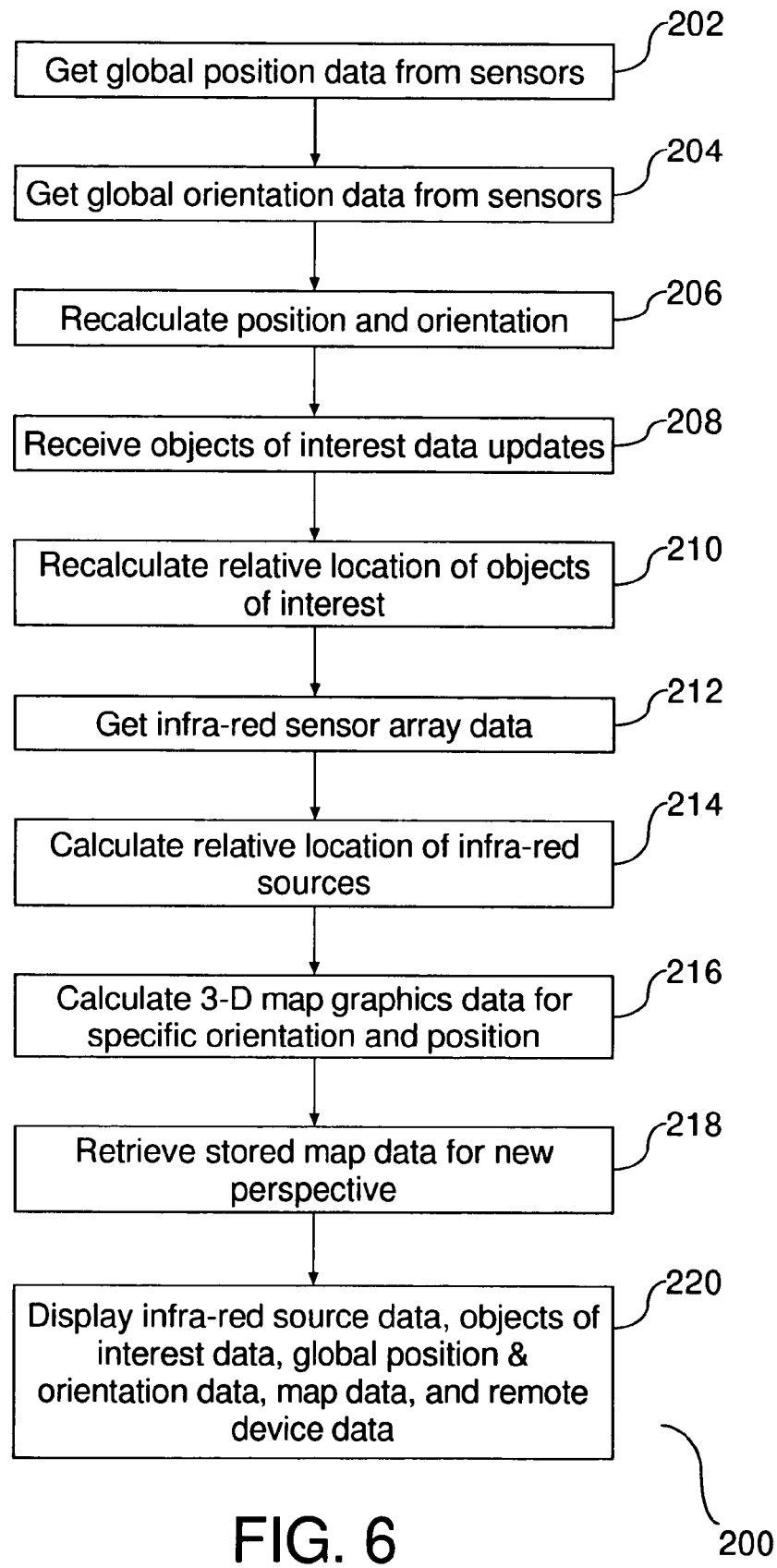
FIG. 6 is a flow diagram illustrating the first person map mode.

FIG. 6 is a flow diagram 200 illustrating the process of obtaining location for object's of interest in a first person map mode (FPMM). Global position data is obtained from a GPS sensor associated with the remote device 202. Thereafter global orientation data is obtained from an electronic compass associated with the control unit 204. The position and orientation of the remote device is recalculated from a prior calculation based upon readings obtained from the associated GPS sensor, electronic accelerometer, and electronic compass 206. Similarly, data associated with any objects of interest must be obtained 208. Thereafter, the location of the objects of interest is re-calculated based upon any new position data obtained from the remote device 210. Following step 210, infra-red sensor array data is collected 212 and calculated relative to the position of the infra-red sources 214. Once all of the data from the remote device and objects of interest are obtained, three dimensional graph data for a specific orientation and position is calculated 216. Map data is retrieved from a data storage medium in communication with the embedded processor of the control unit 218. Thereafter, a map is made visible to the operator of the control unit through the visual display 220. The map is preferably a three dimensional map with data projected as transparent overlay graphics. The project data includes infra-red source data, objects of interest, global position and orientation data, map data, and remote device data.

Advantages Over the Prior Art

The embedded processor of the control unit tracks orientation and position of the control unit 10. Positioning of the control apparatus is conveyed to digital camera optics in communication with the embedded processor. Since the control unit 10 is adapted to be placed against the eyes and/or ears of the operator during use, the position and orientation of the control unit 10 is directly related to the orientation and position of the head of the operator of the control unit 10. The orientation and position information of the control unit may be projected onto the visual display of the control unit. In addition, the orientation and position of the control unit 10 may be conveyed to the remote device and the associated digital camera optics to position the camera associated with the remote device in accordance with the orientation and position of the control unit 10. Communication of orientation and position data enhances interactivity between the control unit and the remote device, aside from the environment of the remote device. In addition, the embedded processor may create a wireframe to give shape to the terrain and synthetic graphics to represent physical items in the noted relative locations, thus producing synthetic vision. The use of a wireframe and/or synthetic graphics timely conveys map, terrain, and shape data to the visual display.

Alternative Embodiments

It will be appreciated that, although specific embodiments of the invention have been described herein for purposes of illustration, various modifications may be made without departing from the spirit and scope of the invention. In particular, the control unit may be designed to communicate with a variety of remote devices. For example, the remote device may be in an electronic or mechanical form with logical states mapped to corresponding input devices and motors of the control unit. The remote device may include a camera that captures live video to provide live video feedback to the control unit. In addition, the control unit may be used to download topographical and/or geographical data independent of or in conjunction with the various modes of operation. The visual display may be in the form of a liquid crystal display, or an alternative medium that enables viewing by the operator while maintaining the integrity of the control unit. Similarly, the wireless communication electronics may be in the form of wireless communication electronics in communication with the embedded processor of the control unit, or an alternative communication electronics that enables wireless communication of data between the embedded processor and a corresponding wireless communication apparatus remote from the control unit. In addition, the scope of the invention should not be limited to the input devices described together with the control unit. Alternative input devices that enable communication of data between the control unit and the remote device may be employed. Accordingly, the scope of protection of this invention is limited only by the following claims and their equivalents.

I claim:

1. An operator control apparatus, compnsing:
   optics in communication with a visual display, wherein said optics is adapted to provide a digital video signal;
   an embedded processor in communication with said optics adapted to track change to orientation and position of said apparatus and to recalculate data to be displayed based on said change;
   a remote device in communication with said apparatus and separate from said apparatus, said remote device having an actuator adapted to be controlled by an input device of said apparatus, and said remote device to communicate global position data of objects of interest to said processor
   said processor to re-calculate location of objects of interest relative to said apparatus;
   said visual display to show a combination of data received from the optics local to the visual display and the remote device, said combination providing location of objects relative to location and orientation of said apparatus.

2. The apparatus of claim 1, further comprising a telescopic lens in communication with said visual display.

3. The apparatus of claim 1, further comprising synthetic vision for data with respect to an object, wherein said synthetic vision provides shape to a physical item relative to location of said physical item with respect to said apparatus.

4. The apparatus of claim 1, further comprising said remote device having a sensor in communication with said visual display.

5. The apparatus of claim 4, further comprising a dynamic feedback control system between said control apparatus and said remote device.

6. The apparatus of claim 1, further comprising an electronic compass adapted to communicate direction of said apparatus with respect to north.

7. The apparatus of claim 1, further comprising an electronic accelerometer adapted to communicate angle of said apparatus with respect to the horizon.

8. The apparatus of claim 1, further comprising a rangefinder adapted to communicate distance to an object of interest.

9. The apparatus of claim 1, further comprising a light amplification sensor array.

10. The apparatus of claim 1, further comprising a directional microphone adapted to detect sound in a specific direction.

11. The apparatus of claim 1, further comprising an input device to communicate with said visual display.

12. The apparatus of claim 11, wherein said input device is selected from a group consisting of: a cursor in communication with said visual display, a graphical user interface, a sensory control, a proportional input device, a pushbutton, and combinations thereof.

13. The apparatus of claim 1, wherein said visual display includes sensory controls to communicate operator commands to said embedded processor.

14. The apparatus of claim 1, further comprising said remote device having a video sensor, and said video sensor mapped to coincide with orientation of said apparatus.

15. The apparatus of claim 1, wherein orientation of said apparatus directly controls orientation of a sensor of said remote device.

16. A method for remote communication comprising:
providing a digital video feed to a visual display through optics; tracking orientation and position change of an apparatus in communication with said visual display;
controlling orientation of a portion of a device remote from said apparatus through orientation of said apparatus, wherein said remote device includes a global positioning sensor;
communicating global position data of an object of interest to said visual display; and
said visual display showing a combination of data received from said optics and said remote device, said combination providing location data of objects relative to location of said apparatus.

17. The method of claim 16, further comprising providing synthetic vision for data with respect to an object.

18. The method of claim 16, further comprising communicating direction with respect to north by means of an electronic compass.

19. The method of claim 16, further comprising communicating angle with respect to the horizon by means of an electronic accelerometer.

20. The method of claim 16, further comprising communicating distance to an object of interest by means of a rangefinder.

21. The method of claim 16, further comprising detecting sound in a specific direction by means of a directional microphone.

22. The method of claim 16, further comprising communicating with said embedded processor through means of an input device.

23. The method of claim 22, wherein said input device is selected from a group consisting of: a cursor in communication with said visual display, a graphical user interface, a sensory control, a proportional input device, a pushbutton, and combinations thereof.

24. An article comprising:
a computer-readable medium encoded with instructions to be executed by a computer, said instructions comprising:
instructions for providing a digital video feed to a visual display through optics local to said visual display and remote from said visual display;
instructions for tracking orientation and position of an apparatus in communication with said visual display;
instructions for controlling orientation of a portion of a device remote from said apparatus through orientation of said apparatus;
instructions for communicating global position of objects of interest as detected from said remote device to said visual display; and
instructions for presenting a combination of data collected by said local optics and said remote device, said combination providing location of objects relative to location of said apparatus.

25. The article of claim 24, further comprising instructions for providing synthetic vision for data with respect to an object.

26. The article of claim 24, further comprising instructions for communicating direction with respect to north and angle with respect to the horizon.

27. The article of claim 24, further comprising instructions for communicating distance to an object of interest.

28. The article of claim 24, further comprising instructions for detecting sound in a specific direction.

29. The article of claim 24, further comprising instructions for communicating with said embedded processor.

30. The article of claim 29, wherein said communication means is selected from a group consisting of: a cursor in communication with said visual display, a graphical user interface, a sensory control, a proportional input device, a pushbutton, and combinations thereof.

31. The article of claim 24, further comprising instructions for controlling position of said remote device through said apparatus.

32. An operator control system, comprising:
an apparatus comprising a global positioning sensor and optics in communication with a visual display, wherein said optics is adapted to provide a digital video signal associated with an object visible to an operator;
a device remote from said apparatus, said device comprising a global positioning sensor and an actuator in communication with said apparatus;
said apparatus comprising an embedded processor in communication with said optics adapted to track change to orientation and position of said apparatus;
a change in orientation of said apparatus causes new orientation data to be communicated to said remote device;
said remote device to communicate global position of an object of interest to said visual display; and
presentation of a combination of data collected by said optics and said remote device, said combination to provide location of objects relative to location of said apparatus.

33. The system of claim 32, further comprising said new orientation data of said remote device to be communicated to said visual display of said apparatus.

34. The apparatus of claim 32, wherein orientation of said remote sensor is mapped to coincide with orientation of said apparatus.

35. An operator control apparatus, comprising:
optics in communication with a visual display, wherein said optics is adapted to provide a digital video signal;
an embedded processor in communication with said optics adapted to track change to orientation and position of said apparatus and to recalculate data to be displayed based on said change;
a remote device in communication with said apparatus and separate from said apparatus, said remote device having an actuator adapted to be controlled by an input device of said apparatus, and said remote device to communicate global position data of objects of interest to said visual display;
said visual display to show a combination of data received from the optics and the remote device; and
synthetic vision for data with respect to an object, wherein said synthetic vision provides shape to a physical item relative to location of said physical item with respect to said apparatus.

* * * * *